US012672665B2

(12) United States Patent (10) Patent No.: US 12,672,665 B2
Mukai (45) Date of Patent: Jul. 7, 2026

(54) FOOD MANUFACTURING METHOD

(71) Applicant: SUNTORY HOLDINGS LIMITED, Osaka City (JP)

(72) Inventor: Atsushi Mukai, Tokyo (JP)

(73) Assignee: SUNTORY HOLDINGS LIMITED, Osaka City (JP)

( * ) Notice: Subject to any disclaimer, the term of this patent is extended or adjusted under 35 U.S.C. 154(b) by 727 days.

(21) Appl. No.: 17/628,362

(22) PCT Filed: Jul. 10, 2020

(86) PCT No.: PCT/JP2020/026994
§ 371 (c)(1),
(2) Date: Jan. 19, 2022

(87) PCT Pub. No.: WO2021/024694
PCT Pub. Date: Feb. 11, 2021

(65) Prior Publication Data
US 2022/0322726 A1 Oct. 13, 2022

(30) Foreign Application Priority Data

Aug. 6, 2019 (JP) ................................. 2019-144298

(51) Int. Cl.
*A23P 30/00* (2016.01)
*A23P 10/00* (2016.01)
(52) U.S. Cl.
CPC ............... *A23P 30/00* (2016.08); *A23P 10/00* (2016.08)
(58) Field of Classification Search
CPC ................. B01F 33/846; B01F 33/848; G06Q 10/06395; G06Q 30/0282; G06Q 50/12; A23P 30/00; A23P 10/00; Y02P 90/30
(Continued)

(56) References Cited

U.S. PATENT DOCUMENTS

| 2015/0220592 A1 | 8/2015 | Robberechts et al. |
| 2018/0130141 A1 | 5/2018 | Carpenter et al. |
| 2018/0293638 A1 | 10/2018 | Simpson |

FOREIGN PATENT DOCUMENTS

| JP | 6-9607 A | 1/1994 |
| JP | 2000-250887 A | 9/2000 |

(Continued)

OTHER PUBLICATIONS

International Search Report dated Oct. 13, 2020, issued in counterpart International Application No. PCT/JP2020/026994, with English Translation. (5 pages).

(Continued)

*Primary Examiner* — Subbalakshmi Prakash
(74) *Attorney, Agent, or Firm* — WHDA, LLP

(57) ABSTRACT

In order to solve a conventional problem that it is difficult to reproduce a taste, a flavor, and the like of food, a food manufacturing support apparatus includes: an ingredient information storage unit in which two or more pieces of ingredient information are stored, the ingredient information each having one or more pieces of feature value specifying information for specifying an amount of each of one or more feature values contained in an ingredient of food, and an ingredient identifier for specifying the ingredient; a feature value recipe identifier information accepting unit that accepts feature value recipe identifier information for specifying two or more pieces of feature value specifying information respectively associated with two or more feature values; a determining unit that determines two or more ingredients and amounts of the ingredients that satisfy two or more pieces of feature value specifying information of the two or more feature values specified with the feature value recipe identifier information accepted by the accepting unit 12, referring to the two or more pieces of ingredient information stored in the ingredient information storage unit; and (Continued)

Food manufacturing support apparatus 1

Storage unit 11
- Ingredient information storage unit 111
- Association table storage unit 112

Accepting unit 12
- Feature value recipe identifier information accepting unit 121
- Recipe information accepting unit 122

Output unit 14
- Ingredient amount specifying information output unit 141

Processing unit 13
- Determining unit 131
  - Feature value specifying information acquiring part 1311
  - Determing part 1312
- Association information accumulating unit 132 an ingredient amount specifying information output unit that outputs ingredient amount specifying information regarding the amounts of the two or more ingredients determined by the determining unit, in association with ingredient identifiers for respectively specifying the ingredients. Accordingly, it is possible to support reproduction of a taste, a flavor, and the like of food.

6 Claims, 14 Drawing Sheets

(58) Field of Classification Search
USPC ........................................................ 426/665
See application file for complete search history.

(56) References Cited

FOREIGN PATENT DOCUMENTS

| | | | |
|---|---|---|---|
| JP | 2004-361998 | A | 12/2004 |
| JP | 2018-518732 | A | 7/2018 |
| WO | 03056493 | A1 | 7/2003 |
| WO | 2005111955 | A1 | 11/2005 |
| WO | 2016019413 | A1 | 2/2016 |

OTHER PUBLICATIONS

Extended (Supplementary)European Search Report dated Jul. 24, 2023, issued in counterpart EP Application No. 20850535.4. (8 pages).
Office Action dated Jul. 19, 2022, issued in counterpart CN Application No. 202080055170.3, with English Translation. (16 pages).

| Feature value identifier / Ingredient identifier | $E_1$ | $E_2$ | $E_3$ | $E_4$ | ... |
|---|---|---|---|---|---|
| $M_1$ | $a_{11}$ | $a_{12}$ | $a_{13}$ | $a_{14}$ | ... |
| $M_2$ | $a_{21}$ | $a_{22}$ | $a_{23}$ | $a_{24}$ | ... |
| $M_3$ | $a_{31}$ | $a_{32}$ | $a_{33}$ | $a_{34}$ | ... |
| ... | ... | ... | ... | ... | ... |

FIG.5

| Feature value recipe identifier | Feature value specifying information |
|---|---|
| Tea when I'm tired | $(E_1{:}b_1,\ E_2{:}b_2,\ E_3{:}b_3,\ E_4{:}b_4)$ |
| I want to feel better | $(E_2{:}c_1,\ E_7{:}c_2, \cdots E_n{:}c_n)$ |
| ... | ... |

FIG.6

FOOD MANUFACTURING METHOD

TECHNICAL FIELD

The present invention relates to a food manufacturing support apparatus and the like for supporting reproduction of a taste, a flavor, and the like of food.

BACKGROUND ART

Conventionally, there have been methods for producing high purity tea catechins at low cost by removing impurities such as sugars and amino acids, caffeine, and catechin oxidation polymers contained in tea without using a liquid extraction process, in order to produce tea catechins on an industrial scale in a safe manner from the standpoint of food safety (see Patent Document 1).

CITATION LIST

Patent Document

Patent Document 1: JP H6-9607A

SUMMARY OF INVENTION

Technical Problem

However, in the conventional techniques, it is difficult to reproduce a taste, a flavor, and the like of food including beverages such as tea.

More specifically, for example, the original ingredients for manufacturing food often contain natural materials, and since the quality of such natural materials varies, it is difficult to reproduce a taste, a flavor, and the like of food when using multiple ingredients in a fixed ratio.

Solution to Problem

A first aspect of the present invention is directed to a food manufacturing support apparatus including: an ingredient information storage unit in which two or more pieces of ingredient information are stored, the ingredient information each having one or more pieces of feature value specifying information for specifying an amount of each of one or more feature values contained in an ingredient of food, and an ingredient identifier for specifying the ingredient; a feature value recipe identifier information accepting unit that accepts feature value recipe identifier information for specifying two or more pieces of feature value specifying information respectively associated with two or more feature values; a determining unit that determines two or more ingredients and amounts of the ingredients that satisfy two or more pieces of feature value specifying information of the two or more feature values specified with the feature value recipe identifier information accepted by the feature value recipe identifier information accepting unit, referring to the two or more pieces of ingredient information stored in the ingredient information storage unit; and an ingredient amount specifying information output unit that outputs ingredient amount specifying information regarding the amounts of the two or more ingredients determined by the determining unit, in association with ingredient identifiers for respectively specifying the ingredients.

With this configuration, it is possible to support reproduction of a taste, a flavor, and the like of food.

Furthermore, a second aspect of the present invention is directed to the food manufacturing support apparatus according to the first aspect, further including: an association table storage unit in which an association table containing two or more pieces of association information is stored, the association information each indicating association between a feature value recipe identifier for identifying a group of two or more pieces of feature value specifying information, and two or more pieces of feature value pair information containing feature value specifying information associated with feature values, wherein the determining unit includes: a feature value specifying information acquiring part that acquires two or more pieces of feature value specifying information of two or more feature values corresponding to a feature value recipe identifier, which is feature value recipe identifier information accepted by the feature value recipe identifier information accepting unit, from the association table storage unit; and a determining part that determines two or more ingredients and amounts of the ingredients that satisfy the two or more pieces of feature value specifying information acquired by the feature value specifying information acquiring part.

With this configuration, it is possible to support reproduction of a taste, a flavor, and the like of food.

Furthermore, a third aspect of the present invention is directed to the food manufacturing support apparatus according to the first or second aspect, wherein the feature values are each based on a chemical component contained in food.

With this configuration, it is possible to support reproduction of a taste, a flavor, and the like of food.

Furthermore, a fourth aspect of the present invention is directed to the food manufacturing support apparatus according to the third aspect, wherein the two or more feature values are each obtained through dimensional compression of a chemical component contained in food.

With this configuration, it is possible to support reproduction of a taste, a flavor, and the like of food at a reduced processing cost.

Furthermore, a fifth aspect of the present invention is directed to the food manufacturing support apparatus according to any one of the first to fourth aspects, wherein the ingredient is a substance derived from a living organism.

With this configuration, it is possible to support reproduction of a taste, a flavor, and the like of food.

Furthermore, a sixth aspect of the present invention is directed to the food manufacturing support apparatus according to any one of the first to fifth aspects, further including: a recipe information accepting unit that accepts recipe information having a feature value recipe identifier, and one or more pieces of ingredient amount pair information, each of which is a pair of an ingredient identifier and ingredient amount specifying information for specifying an amount of an ingredient; and an association information accumulating unit that acquires one or more pieces of feature value specifying information for specifying amounts of one or more feature values paired with an ingredient identifier contained in each of one or more pieces of ingredient amount pair information contained in the recipe information, from the ingredient information storage unit, configures association information having the one or more pieces of feature value specifying information and the feature value recipe identifier contained in the one or more pieces of ingredient amount pair information contained in the recipe information, and accumulates the association information.

With this configuration, it is possible to register a recipe based on a feature value.

Furthermore, a seventh aspect of the present invention is directed to the food manufacturing support apparatus according to any one of the first to sixth aspects, further including: a feature value specifying information receiving unit that receives feature value specifying information associated with each of two or more feature values, using a feature value recipe identifier accepted by the feature value recipe identifier information accepting unit from an information processing apparatus including an association table storage unit in which an association table containing two or more pieces of association information is stored, the association information each indicating association between a feature value recipe identifier and feature value specifying information associated with each of two or more feature values, wherein the determining unit determines two or more ingredients and amounts of the ingredients that satisfy two or more pieces of feature value specifying information received by the feature value specifying information receiving unit, referring to the two or more pieces of ingredient information stored in the ingredient information storage unit.

With this configuration, it is possible to obtain feature value specifying information from an information processing apparatus for managing feature value recipes.

Furthermore, an eighth aspect of the present invention is directed to an information processing apparatus including: an ingredient information storage unit in which two or more pieces of ingredient information are stored, the ingredient information each having one or more pieces of feature value specifying information for specifying an amount of each of one or more feature values contained in an ingredient of food, and an ingredient identifier for specifying the ingredient; an association table storage unit in which an association table containing two or more pieces of association information is stored, the association information each indicating association between a feature value recipe identifier and feature value specifying information associated with each of two or more feature values; a recipe information receiving unit that receives recipe information having a feature value recipe identifier, and one or more pieces of ingredient amount pair information, each of which is a pair of an ingredient identifier and ingredient amount specifying information for specifying an amount of an ingredient; and an association information accumulating unit that acquires one or more pieces of feature value specifying information for specifying amounts of one or more feature values paired with an ingredient identifier contained in each of one or more pieces of ingredient amount pair information contained in the recipe information, from the ingredient information storage unit, configures association information having the one or more pieces of feature value specifying information and the feature value recipe identifier contained in the one or more pieces of ingredient amount pair information contained in the recipe information, and accumulates the association information in the association table storage unit.

With this configuration, it is possible to register a feature value recipe.

Furthermore, a ninth aspect of the present invention is directed to the information processing apparatus according to the eighth aspect, further including: a feature value recipe identifier receiving unit that receives a feature value recipe identifier; a feature value specifying information acquiring unit that acquires feature value specifying information associated with each of two or more feature values paired with the feature value recipe identifier, from the association table storage unit; and a feature value specifying information transmitting unit that transmits the two or more pieces of feature value specifying information acquired by the feature value specifying information acquiring unit.

With this configuration, it is possible to manage and use a feature value recipe.

Furthermore, a tenth aspect of the present invention is directed to a food manufacturing apparatus according to any one of the first to sixth aspects, including: an ingredient storage in which two or more ingredients are stored; an amount specifying information accepting unit that accepts amount specifying information for specifying an amount of each of the two or more ingredients output by the food manufacturing support apparatus; an ingredient taking-out mechanism that takes out two or more ingredients in the amounts specified with the respective pieces of amount specifying information of the ingredients accepted by the amount specifying information accepting unit, from the ingredient storage; and a food manufacturing portion that manufactures food using the two or more ingredients taken out by the ingredient taking-out mechanism.

With this configuration, it is possible to obtain food with a reproduced taste, flavor, and the like of food.

Furthermore, an eleventh aspect of the present invention is directed to the food manufacturing apparatus according to the tenth aspect, wherein the ingredient is a powder or a liquid, and the food is a beverage.

With this configuration, it is possible to obtain a beverage with a reproduced taste, flavor, and the like of food.

Advantageous Effects of Invention

With the food manufacturing support apparatus according to the present invention, it is possible to support reproduction of a taste, a flavor, and the like of food.

BRIEF DESCRIPTION OF DRAWINGS

FIG. 5 is a diagram showing an ingredient information management table in the embodiment.

FIG. 6 is a diagram showing an association table in the embodiment.

DESCRIPTION OF EMBODIMENT

Figure 1:
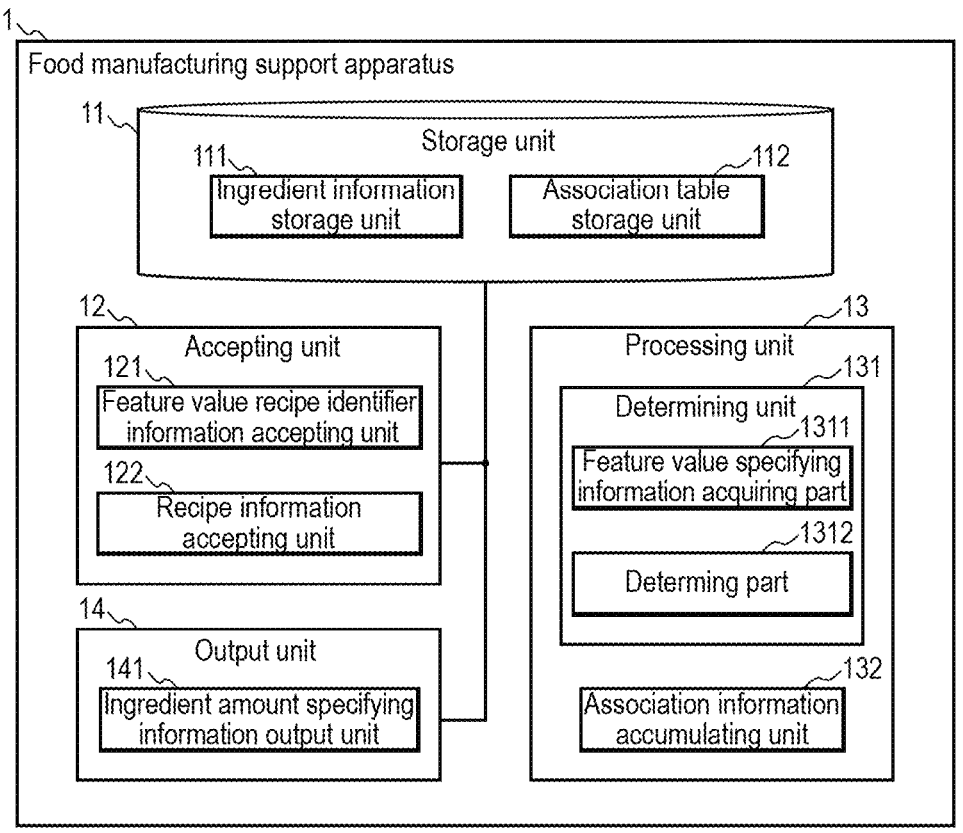
FIG. 1 is block diagram of a food manufacturing support apparatus 1 in Embodiment 1.

Hereinafter, embodiments of a food manufacturing support apparatus and the like will be described with reference to the drawings. It should be noted that constituent elements denoted by the same reference numerals in the embodiments perform similar operations, and thus a description thereof may not be repeated.

Embodiment 1

In this embodiment, a food manufacturing support apparatus will be described that acquires and outputs amounts of two or more ingredients corresponding to accepted feature value recipe identifier information in a situation in which two or more pieces of ingredient information each having information of the amount of each of one or more feature values contained in an ingredient in a unit amount and an ingredient identifier for specifying the ingredient are stored. The feature value recipe identifier information is information for specifying two or more feature values of food. The feature value recipe identifier information is, for example, information for specifying a preference, a feeling, and the like. The feature values are, for example, each based on a chemical component contained in food, or, for example, each a chemical component contained in food or obtained through dimensional compression of the chemical component. Typically, the ingredient is a substance derived from a living organism.

FIG. 1 is block diagram of a food manufacturing support apparatus 1 in this embodiment. The food manufacturing support apparatus 1 includes a storage unit 11, an accepting unit 12, a processing unit 13, and an output unit 14.

The storage unit 11 includes an ingredient information storage unit 111 and an association table storage unit 112. The accepting unit 12 includes a feature value recipe identifier information accepting unit 121 and a recipe information accepting unit 122. The processing unit 13 includes a determining unit 131 and an association information accumulating unit 132. The determining unit 131 includes a feature value specifying information acquiring part 1311 and a determining part 1312. The output unit 14 includes an ingredient amount specifying information output unit 141.

Various types of information are stored in the storage unit 11. The various types of information are, for example, later-described ingredient information and later-described association table.

Two or more pieces of ingredient information each regarding an ingredient are stored in the ingredient information storage unit 111. It is preferable that the ingredient is a substance derived from a living organism. Examples of the substance derived from a living organism include a plant, an animal, substances obtained from a plant, and substances obtained from an animal. There is no limitation on the ingredient, and examples thereof include a solid, a liquid, and a gas. The ingredient is, for example, a powder or a liquid.

The ingredient information is information regarding an ingredient for manufacturing food. The ingredient information has one or more pieces of feature value specifying information and an ingredient identifier. The ingredient information may have, for example, an ingredient identifier and one or more pieces of feature value pair information. The ingredient information may be, for example, an ingredient identifier and a vector whose elements are one or more pieces of feature value specifying information.

The feature value specifying information is information for specifying the amount of each of one or more feature values contained in an ingredient. The feature value specifying information may be the amount of one feature value contained in an ingredient in a unit amount, information indicating the proportion of one feature value out of two or more feature values contained in an ingredient, or the like. The amount of a feature value is, for example, a weight, a volume, or the like, and examples thereof include grams, milligrams, and milliliters.

The ingredient identifier is information for specifying an ingredient. The ingredient identifier is, for example, an ingredient name, an ID, or the like.

The feature values are each based on a chemical component contained in food. The feature values are, for example, a chemical component contained in an ingredient, an aroma component contained in an ingredient, a taste component contained in an ingredient, or an element of a vector obtained through dimensional compression of a chemical component or the like contained in an ingredient.

An association table is stored in the association table storage unit 112. The association table contains two or more pieces of association information. The association information is information indicating association between a feature value recipe identifier and two or more pieces of feature value specifying information. The association information has, for example, a feature value recipe identifier and a vector whose elements are two or more pieces of feature value specifying information. The feature value pair information is a pair of a feature value identifier and feature value specifying information. The feature value recipe identifier is information for identifying a group of feature values. The feature value recipe identifier is, for example, information for specifying a user's condition, information for specifying a user's feeling or preference, a name for specifying a customer or a customer's attribute, a name for specifying external information (weather, temperature, date), or the like. The information for specifying a user's condition is, for example, "I'm tired", "I'm sad", "I want to feel better", or "recommend tea when sleepy". The information for specifying a user's feeling or preference is, for example, "my favorite tea", "tea for when I want to feel calm", or "strong tea". The name for specifying a customer or a customer's attribute is, for example, "tea that works for the elderly", "black tea for women", or "Mr. A's usual green tea". The name for specifying external information is, for example, "tea for summer" or "tea for tropical night measures". The feature value recipe identifier may be an ID or the like, or any other information with which a group of feature values can be identified.

The accepting unit 12 accepts various types of instructions, information, and the like. The various types of instructions, information, and the like are, for example, later-described feature value recipe identifier information.

The various types of instructions, information, and the like may be input by any device such as a touch panel, a keyboard, a mouse, or a menu screen. The accepting unit 12 may be realized by a device driver for an input device such as a touch panel or a keyboard, or control software for a menu screen.

The accepting in this example is a concept that encompasses accepting information input from an input device such as a keyboard, a mouse, or a touch panel, receiving information transmitted via a wired or wireless communication line, and accepting information read from a storage medium such as an optical disk, a magnetic disk, or a semiconductor memory.

The feature value recipe identifier information accepting unit 121 accepts feature value recipe identifier information. The feature value recipe identifier information is, for example, a feature value recipe identifier. The feature value recipe identifier information may be, for example, two or more pieces of feature value specifying information, two or more pieces of feature value pair information, or the like.

The recipe information accepting unit 122 accepts recipe information. The recipe information is information regarding a food recipe. The recipe information has a feature value recipe identifier and one or more pieces of ingredient amount pair information. The ingredient amount pair information is a pair of an ingredient identifier and ingredient amount specifying information. The ingredient amount specifying information is information for specifying the amount of an ingredient. The ingredient amount specifying information is ingredient amount information indicating the amount of an ingredient or ingredient proportion information indicating the proportion of one ingredient out of a group of two or more ingredients.

The processing unit 13 performs various types of processing. The various types of processing are, for example, processing that is performed by the determining unit 131.

The determining unit 131 determines two or more ingredients and amounts of the ingredients that satisfy two or more pieces of feature value specifying information of the two or more feature values specified with the feature value recipe identifier information accepted by the accepting unit 12, referring to the two or more pieces of ingredient information stored in the ingredient information storage unit 111.

The determining is, for example, acquiring two or more pieces of ingredient amount pair information. The ingredient amount pair information is information of a pair of an ingredient identifier and ingredient amount specifying information for specifying the amount of an ingredient.

For example, the determining unit 131 acquires two or more pieces of feature value specifying information paired with the feature value recipe identifier accepted by the accepting unit 12, from an association table. Then, the determining unit 131 acquires two or more pieces of ingredient amount pair information that satisfy the acquired two or more pieces of feature value specifying information. The ingredient amount specifying information is, for example, information indicating the amounts and proportions of ingredients. The ingredient amount specifying information is, for example, a vector whose elements are information regarding the amounts of ingredients.

In the case in which the feature value recipe identifier information accepted by the feature value recipe identifier information accepting unit 121 is a feature value recipe identifier, the feature value specifying information acquiring part 1311 acquires two or more pieces of feature value specifying information of two or more feature values corresponding to the feature value recipe identifier information, from the association table storage unit 112.

Furthermore, in the case in which the feature value recipe identifier information accepted by the feature value recipe identifier information accepting unit 121 contains two or more pieces of feature value specifying information, the feature value specifying information acquiring part 1311 acquires the accepted two or more pieces of feature value specifying information.

The determining part 1312 determines two or more ingredients and amounts of the ingredients that satisfy the two or more pieces of feature value specifying information acquired by the feature value specifying information acquiring part 1311. The determining part 1312 acquires one or more pairs of an ingredient identifier and ingredient amount specifying information that satisfy the two or more pieces of feature value specifying information acquired by the feature value specifying information acquiring part 1311, referring to the two or more pieces of ingredient information stored in the ingredient information storage unit 111.

For example, the determining part 1312 configures a set of simultaneous equations whose variables are the amounts of two or more ingredients, parameters are the amounts of one or more feature values corresponding to each of the two or more ingredients, and solutions are the amounts of two or more feature values, and solves the equations, thereby acquiring the amounts and ingredient identifiers of the two or more ingredients.

Furthermore, for example, the determining part 1312 acquires a matrix whose elements are the amounts of one or more feature values corresponding to each of the two or more ingredients, calculates an inverse matrix of the matrix, and multiplies the inverse matrix by a vector whose elements are the amounts of two or more feature values, thereby calculating the amounts and ingredient identifiers of the two or more ingredients.

There is no limitation on the algorithm in which the determining part 1312 determines ingredients and the amounts of the ingredients.

The association information accumulating unit 132 acquires one or more pieces of feature value specifying information for specifying amounts of one or more feature values paired with an ingredient identifier contained in each of one or more pieces of ingredient amount pair information contained in the recipe information accepted by the recipe information accepting unit 122, from the ingredient information storage unit 111. The association information accumulating unit 132 acquires a feature value recipe identifier contained in the one or more pieces of ingredient amount pair information contained in the recipe information accepted by the recipe information accepting unit 122. Then, the association information accumulating unit 132 configures association information having the acquired feature value recipe identifier and the acquired one or more pieces of feature value specifying information, and accumulates the association information. The association information accumulating unit 132 may accumulate the association information in either the association table storage unit 112 or an unshown external apparatus.

The output unit 14 outputs various types of information. The various types of information are, for example, ingredient amount specifying information.

The output in this example is a concept that encompasses display on a display screen, projection using a projector, printing by a printer, output of a sound, transmission to an external apparatus, accumulation in a storage medium, delivery of a processing result to another processing apparatus or another program, and the like.

The ingredient amount specifying information output unit 141 outputs ingredient amount specifying information regarding the amounts of the two or more ingredients determined by the determining unit 131, in association with ingredient identifiers for respectively specifying the ingredients. It is preferable that the ingredient amount specifying information output unit 141 outputs the feature value recipe identifier accepted by the feature value recipe identifier information accepting unit 121, and one or more pairs of an ingredient identifier and ingredient amount specifying information.

The storage unit 11, the ingredient information storage unit 111, and the association table storage unit 112 are preferably non-volatile storage media, but can also be realized by volatile storage media.

There is no limitation on the procedure in which information is stored in the storage unit 11 and the like. For example, information may be stored in the storage unit 11 and the like via a storage medium, information transmitted via a communication line or the like may be stored in the storage unit 11 and the like, or information input via an input device may be stored in the storage unit 11 and the like.

The accepting unit 12, the feature value recipe identifier information accepting unit 121, and the recipe information accepting unit 122 may be realized, for example, by a device driver for an input device such as a touch panel or a keyboard, or control software for a menu screen.

The processing unit 13, the determining unit 131, the association information accumulating unit 132, the feature value specifying information acquiring part 1311, and the determining part 1312 may be realized typically by MPUs, memories, or the like. Typically, the processing procedure of the processing unit 13 and the like is realized by software, and the software is stored in a storage medium such as a ROM. Note that the processing procedure may be realized by hardware (a dedicated circuit).

The output unit 14 and the ingredient amount specifying information output unit 141 may be considered to include or to not include an output device such as a display screen or a speaker. The output unit 14 and the like may be realized by driver software for an output device, a combination of driver software for an output device and the output device, or the like.

Next, an operation example of the food manufacturing support apparatus 1 will be described with reference to the flowchart in FIG. 2.

(Step S201) The feature value recipe identifier information accepting unit 121 determines whether or not it has accepted feature value recipe identifier information. If it has accepted feature value recipe identifier information, the procedure advances to step S202, or otherwise the procedure advances to step S204.

(Step S202) The determining unit 131 performs determining processing for determining the blending ratio of two or more ingredients. An example of this determining processing will be described with reference to the flowchart in FIG. 3.

(Step S203) The ingredient amount specifying information output unit 141 outputs the two or more pieces of ingredient amount pair information acquired in step S202.

(Step S204) The recipe information accepting unit 122 determines whether or not it has accepted recipe information. If it has accepted recipe information, the procedure advances to step S205, or otherwise the procedure returns to step S201.

(Step S205) The association information accumulating unit 132 performs processing for configuring association information using the recipe information accepted in step S204. An example of this association information configuring processing will be described with reference to the flowchart in FIG. 4.

(Step S206) The association information accumulating unit 132 accumulates the association information configured in step S205.

Figure 2:
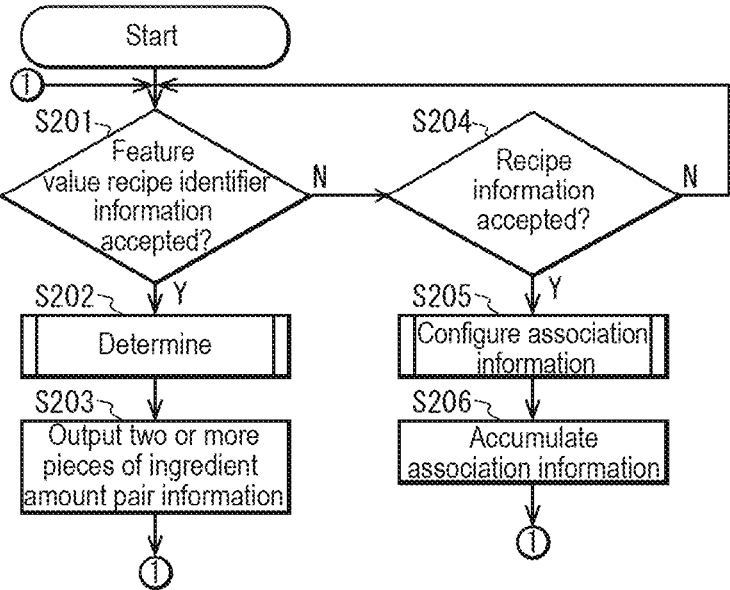
FIG. 2 is a flowchart illustrating an operation example of the food manufacturing support apparatus 1 in the embodiment.

In the flowchart in FIG. 2, the processing ends at power off or at an interruption of termination processing.

Figure 3:
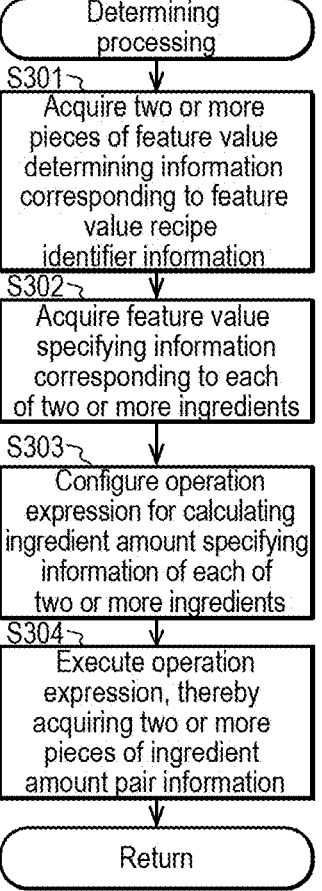
FIG. 3 is a flowchart illustrating an example of determining processing in the embodiment.

Next, an example of the determining processing in step S202 will be described with reference to the flowchart in FIG. 3.

(Step S301) The feature value specifying information acquiring part 1311 acquires two or more pieces of feature value specifying information corresponding to the accepted feature value recipe identifier information, from the association table storage unit 112.

(Step S302) The determining part 1312 acquires feature value specifying information corresponding to each of the two or more ingredients, from the ingredient information storage unit 111.

(Step S303) The determining part 1312 configures an operation expression for calculating ingredient amount specifying information regarding the amounts of the two or more ingredients that satisfy the two or more pieces of feature value specifying information acquired in step S301, using the two or more pieces of feature value specifying information acquired in step S301 and the feature value specifying information corresponding to each of the two or more ingredients acquired in step S302.

(Step S304) The determining part 1312 executes the operation expression configured in step S303, thereby acquiring ingredient amount specifying information corresponding to the two or more ingredients. That is to say, the determining part 1312 acquires two or more pieces of ingredient amount pair information, which is a pair of an ingredient identifier and ingredient amount specifying information. The procedure returns to the upper-level processing.

Next, an example of the association information configuring processing in step S205 will be described with reference to the flowchart in FIG. 4.

(Step S401) The association information accumulating unit 132 substitutes 1 for a counter i.

(Step S402) The association information accumulating unit 132 determines whether or not there is an $i^{-th}$ piece of ingredient amount specifying information in the accepted recipe information. If there is an $i^{-th}$ piece of ingredient amount specifying information, the procedure advances to step S403, or otherwise the procedure advances to step S405.

(Step S403) The association information accumulating unit 132 acquires one or more pieces of feature value pair information paired with an ingredient identifier corresponding to the $i^{-th}$ piece of ingredient amount specifying information, from the ingredient information storage unit 111. The feature value pair information has a feature value identifier and feature value specifying information.

(Step S404) The association information accumulating unit 132 increments the counter i by 1. The procedure returns to step S402.

(Step S405) The association information accumulating unit 132 substitutes 1 for a counter j.

(Step S406) The association information accumulating unit 132 determines whether or not there is a $j^{-th}$ type of feature value identifier in the feature value identifiers acquired in step S403. If there is a $j^{-th}$ type of feature value identifier, the procedure advances to step S407, or otherwise the procedure advances to step S411. The $j^{-th}$ type of feature value identifier is a different $j^{-th}$ feature value identifier.

(Step S407) The association information accumulating unit 132 acquires all pieces of feature value specifying information paired with the $j^{-th}$ type of feature value identifier, from the feature value pair information acquired in step S403.

(Step S408) The association information accumulating unit 132 adds all pieces of feature value specifying information acquired in step S407, thereby calculating feature value specifying information paired with the $j^{-th}$ type of feature value identifier.

(Step S409) The association information accumulating unit 132 configures and temporarily stores feature value pair information in which the $j^{-th}$ type of feature value identifier and the feature value specifying information calculated in step S408 are associated with each other.

(Step S410) The association information accumulating unit 132 increments the counter j by 1. The procedure returns to step S406.

(Step S411) The association information accumulating unit 132 acquires a feature value recipe identifier from the accepted recipe information.

(Step S412) The association information accumulating unit 132 configures association information having the feature value recipe identifier acquired in step S411 and the feature value pair information accumulated in step S409. The procedure returns to the upper-level processing.

Figure 4:
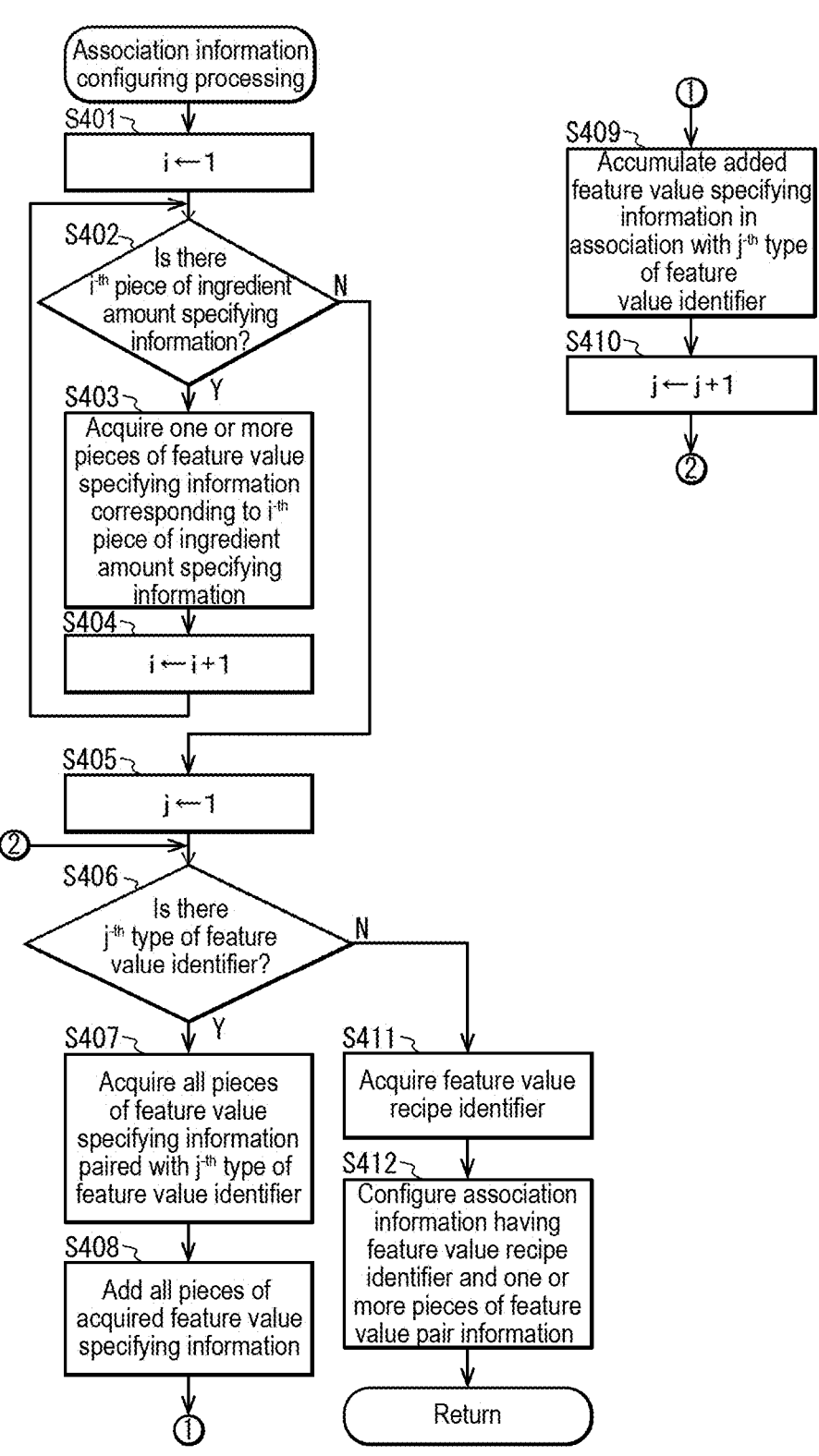
FIG. 4 is a flowchart illustrating an example of association information configuring processing in the embodiment.

In the flowchart in FIG. 4, the processing unit 13 may perform dimensional compression on N pieces of feature value pair information (N is two or more) accumulated in step S409, thereby acquiring (N−1) or less pieces of feature value pair information. This dimensional compression is realized by, for example, multivariate analysis, in particular principal component analysis or the like. The techniques such as multivariate analysis and principal component analysis are known techniques, and thus a detailed description thereof has been omitted.

Hereinafter, a specific operation of the food manufacturing support apparatus 1 in this embodiment will be described.

It is assumed that an ingredient information management table shown in FIG. 5 is stored in the ingredient information storage unit 111. The ingredient information management table is a table for managing ingredient information. One or more records each having an ingredient identifier and feature value information indicating the amount of each of one or more feature values contained in a basic unit (e.g., 1 g) of ingredient identified with the ingredient identifier are stored in the ingredient information management table. In FIG. 5, $M_1$, $M_2$, and $M_3$ are ingredient identifiers. $E_1$, $E_2$, $E_3$, and $E_4$ are feature value identifiers. In FIG. 5, it is seen that the ingredient "$M_1$" contains a feature value "$E_1$" in an amount of $a_{11}$, a feature value "$E_2$" in an amount of $a_{12}$, a feature value "$E_3$" in an amount of $a_{13}$, and a feature value "$E_4$" in an amount of $a_{14}$. It will be appreciated that there is no limitation on the unit of amounts $a_{11}$ to $a_{14}$. In FIG. 5, for simplicity of explanation, it is assumed that each of ingredients $M_1$, $M_2$, and $M_3$ contains only feature values $E_1$, $E_2$, $E_3$, and $E_4$.

Furthermore, an association table shown in FIG. 6 is stored in the association table storage unit 112. The association table has a feature value recipe identifier and feature value specifying information (a vector in this example). In FIG. 6, it is seen that the feature value recipe identifier "tea when I'm tired" contains a feature value "$E_1$" in an amount of $b_1$, a feature value "$E_2$" in an amount of $b_2$, a feature value "$E_3$" in an amount of $b_3$, and a feature value "$E_4$" in an amount of $b_4$. The attribute values such as $b_1$ to $b_4$ in the table in FIG. 6 may be either an amount or a proportion.

In such a situation, the following two specific examples will be described. Specific Example 1 shows processing that accepts a feature value recipe identifier and outputs ingredient amount pair information. Specific Example 2 shows processing that registers association information using accepted recipe information.

Specific Example 1

It is assumed that a user has input a feature value recipe identifier "tea when I'm tired" to the food manufacturing support apparatus 1. Then, the feature value recipe identifier information accepting unit 121 accepts the feature value recipe identifier "tea when I'm tired".

Next, the feature value specifying information acquiring part 1311 acquires feature value specifying information ($E_1$: $b_1$, $E_2$: $b_2$, $E_3$: $b_3$, $E_4$: $b_4$) corresponding to the accepted feature value recipe identifier information "tea when I'm tired", from the association table in FIG. 6.

Next, the determining part 1312 acquires feature value specifying information "$M_1$: $a_{11}$, $a_{12}$, $a_{13}$, $a_{14}$", "$M_2$: $a_{21}$, $a_{22}$, $a_{23}$, $a_{24}$", "$M_3$: $a_{31}$, $a_{32}$, $a_{33}$, $a_{34}$" corresponding to the two or more ingredients ($M_1$, $M_2$, and $M_3$, in this example) from the ingredient information management table (FIG. 5).

Next, the determining part 1312 configures an operation expression for calculating ingredient amount specifying information regarding the amounts of the two or more ingredients that satisfy the acquired two or more pieces of feature value specifying information, using the acquired two or more pieces of feature value specifying information and feature value specifying information corresponding to the acquired two or more ingredients. For example, the determining part 1312 configures an equation shown as Equation 1 below.

$$b_1 = a_{11} \cdot x + a_{21} \cdot y + a_{31} z$$

$$b_2 = a_{12} \cdot x + a_{22} \cdot y + a_{32} z$$

$$b_3 = a_{13} \cdot x + a_{23} \cdot y + a_{33} z$$

$$b_4 = a_{14} \cdot x + a_{24} \cdot y + a_{34} z \qquad \text{Equation 1}$$

In Equation 1, x, y, and z are ingredient amount specifying information respectively corresponding to the ingredients $M_1$, $M_2$, and $M_3$.

Furthermore, for example, the determining part 1312 may configure an operation expression shown as Equation 2 below.

$$\begin{bmatrix} x \\ y \\ z \end{bmatrix} = \begin{bmatrix} a_{11} & a_{11} & a_{11} \\ a_{12} & a_{12} & a_{12} \\ a_{13} & a_{13} & a_{13} \\ a_{14} & a_{14} & a_{14} \end{bmatrix}^{-1} \begin{bmatrix} b_1 \\ b_2 \\ b_3 \\ b_4 \end{bmatrix} \qquad \text{Equation 2}$$

In Equation 2, x, y, and z are ingredient amount specifying information respectively corresponding to the ingredients $M_1$, $M_2$, and $M_3$.

Then, it is assumed that the determining part 1312 executes Equation 1 or 2, thereby acquiring ingredient amount specifying information $r_1$, $r_2$, and $r_3$ corresponding to the ingredients $M_1$, $M_2$, and $M_3$. Next, the determining part 1312 configures three pieces of ingredient amount pair information ($M_1$, $r_1$), ($M_2$, $r_2$), and ($M_3$, $r_3$).

Next, the ingredient amount specifying information output unit 141 outputs the feature value recipe identifier "tea when I'm tired" and the acquired three pieces of ingredient amount pair information $(M_1, r_1)$, $(M_2, r_2)$, and $(M_3, r_3)$.

Specific Example 2

It is assumed that a user A has input recipe information having a feature value identifier "A's first tea" and ingredient amount pair information $(M_1, i_1)$ and $(M_2, i_2)$ to the food manufacturing support apparatus 1. Then, the recipe information accepting unit 122 accepts the recipe information.

Next, the association information accumulating unit 132 acquires feature value pair specifying information "$M_1: a_{11}, a_{12}, a_{13}, a_{14}$" paired with an ingredient identifier "$M_1$" corresponding to a first piece of ingredient amount specifying information, from the ingredient information management table in FIG. 5. The association information accumulating unit 132 acquires feature value pair specifying information "$M_2: a_{21}, a_{22}, a_{23}, a_{24}$" paired with an ingredient identifier "$M_2$" corresponding to a second piece of ingredient amount specifying information, from the ingredient information management table in FIG. 5.

Next, the association information accumulating unit 132 acquires an amount of a feature value "$E_1$" by calculating "$a_{11} \times i_1 + a_{21} \times i_2$". The association information accumulating unit 132 acquires an amount of a feature value "$E_2$" by calculating "$a_{12} \times i_1 + a_{22} \times i_2$". The association information accumulating unit 132 acquires an amount of a feature value "$E_3$" by calculating "$a_{13} \times i_1 + a_{23} \times i_2$". Furthermore, the association information accumulating unit 132 acquires an amount of a feature value "$E_4$" by calculating "$a_{14} \times i_1 + a_{24} \times i_2$". Then, the association information accumulating unit 132 acquires the feature value identifier "A's first tea" and feature value pair information "$E_1: a_{11} \times i_1 + a_{21} \times i_2$", "$E_2: a_{12} \times i_1 + a_{22} \times i_2$", "$E_3: a_{13} \times i_1 + a_{23} \times i_2$", and "$E_4: a_{14} \times i_1 + a_{24} \times i_2$". Then, the association information accumulating unit 132 configures association information "A's first tea | ($E_1: E_2: a_{12} \times i_1 + a_{22} \times i_2, E_3: a_{13} \times i_1 + a_{23} \times i_2, E_4: a_{44} \times i_1 + a_{24} \times i_2$)" having the feature value recipe identifier and the feature value pair information. Next, the association information accumulating unit 132 accumulates the configured association information in the association table in FIG. 6.

As described above, according to this embodiment, it is possible to support reproduction of a taste, a flavor, and the like of food.

Furthermore, according to this embodiment, it is possible to support reproduction of a taste, a flavor, and the like of food at a reduced processing cost.

Furthermore, according to this embodiment, it is possible to accept recipe information and register association information.

Furthermore, according to this embodiment, it is possible to obtain feature value specifying information from an information processing apparatus for managing feature value recipes.

The processing in this embodiment may be realized by software. The software may be distributed by software downloads or the like. Furthermore, the software may be distributed in a form where the software is stored in a storage medium such as a CD-ROM. The same applies to other embodiments in this specification. The software that realizes the food manufacturing support apparatus 1 in this embodiment is the following sort of program. Specifically, this program is a program for causing a computer capable of accessing an ingredient information storage unit in which two or more pieces of ingredient information are stored, the ingredient information each having one or more pieces of feature value specifying information for specifying an amount of each of one or more feature values contained in an ingredient of food, and an ingredient identifier for specifying the ingredient, to function as: a feature value recipe identifier information accepting unit that accepts feature value recipe identifier information for specifying two or more pieces of feature value specifying information respectively associated with two or more feature values; a determining unit that determines two or more ingredients and amounts of the ingredients that satisfy two or more pieces of feature value specifying information of the two or more feature values specified with the feature value recipe identifier information accepted by the feature value recipe identifier information accepting unit, referring to the two or more pieces of ingredient information stored in the ingredient information storage unit; and an ingredient amount specifying information output unit that outputs ingredient amount specifying information regarding the amounts of the two or more ingredients determined by the determining unit, in association with ingredient identifiers for respectively specifying the ingredients.

Embodiment 2

In this embodiment, a case will be described in which two or more pieces of feature value specifying information are acquired using an association table managed by an information processing apparatus that is a server that has received a feature value recipe identifier, the two or more pieces of feature value specifying information are transmitted from the information processing apparatus to a food manufacturing support apparatus 3, and two or more pieces of ingredient amount specifying information are acquired from the two or more pieces of feature value specifying information received by the food manufacturing support apparatus 3.

Figure 7:
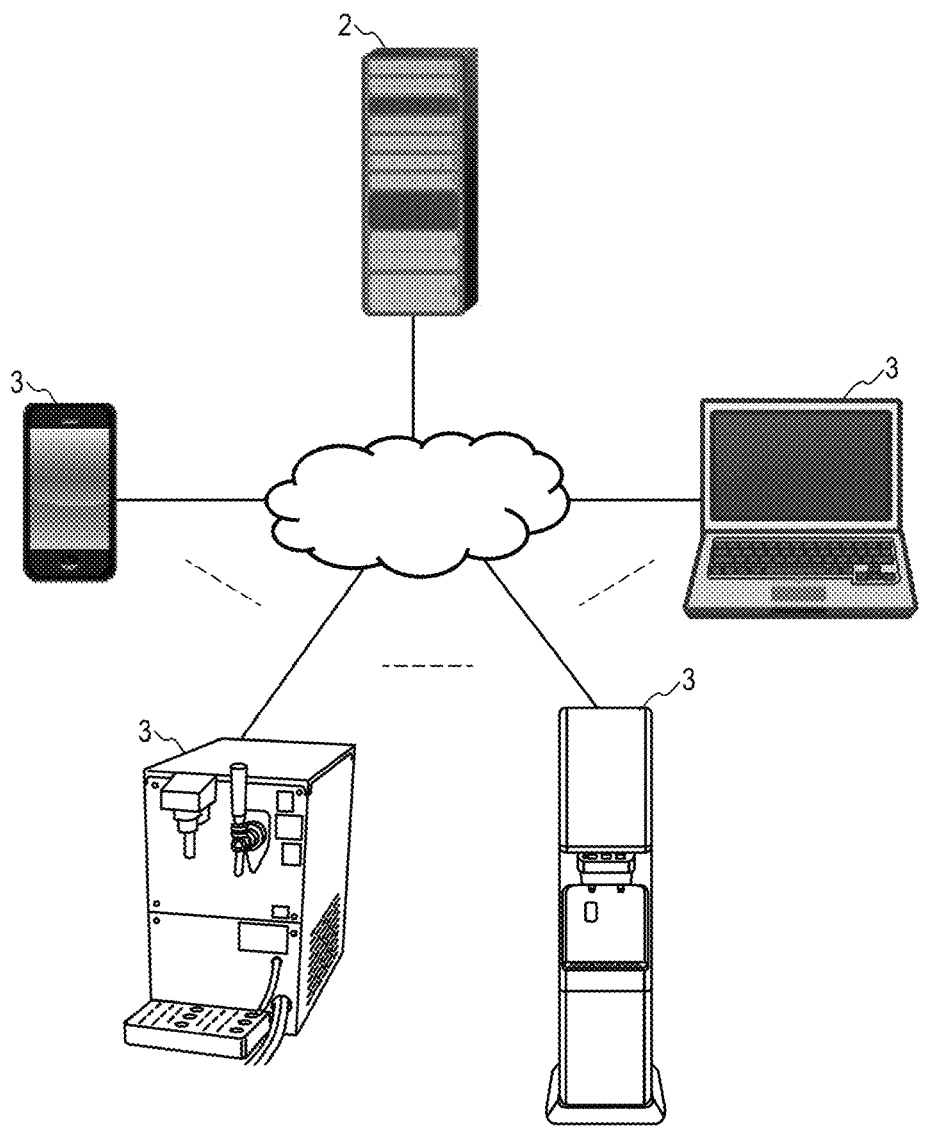
FIG. 7 is a conceptual diagram of an information system A in Embodiment 2.

FIG. 7 is a conceptual diagram of an information system A in this embodiment. The information system A includes an information processing apparatus 2 and one or at least two food manufacturing support apparatuses 3. The information processing apparatus 2 and the one or more food manufacturing support apparatuses 3 can communicate with each other via a network such as the Internet or a dedicated line. The information processing apparatus 2 in this example is a so-called server apparatus. The information processing apparatus 2 is, for example, a cloud server or an ASP server, and there is no limitation on the type or installation location thereof. Each food manufacturing support apparatus 3 is a mobile terminal such as a smartphone, a tablet device, or a mobile phone, a so-called personal computer, a mechanism included in a food manufacturing apparatus, which will be described in Embodiment 3, or the like, and there is no limitation on the type thereof.

Figure 8:
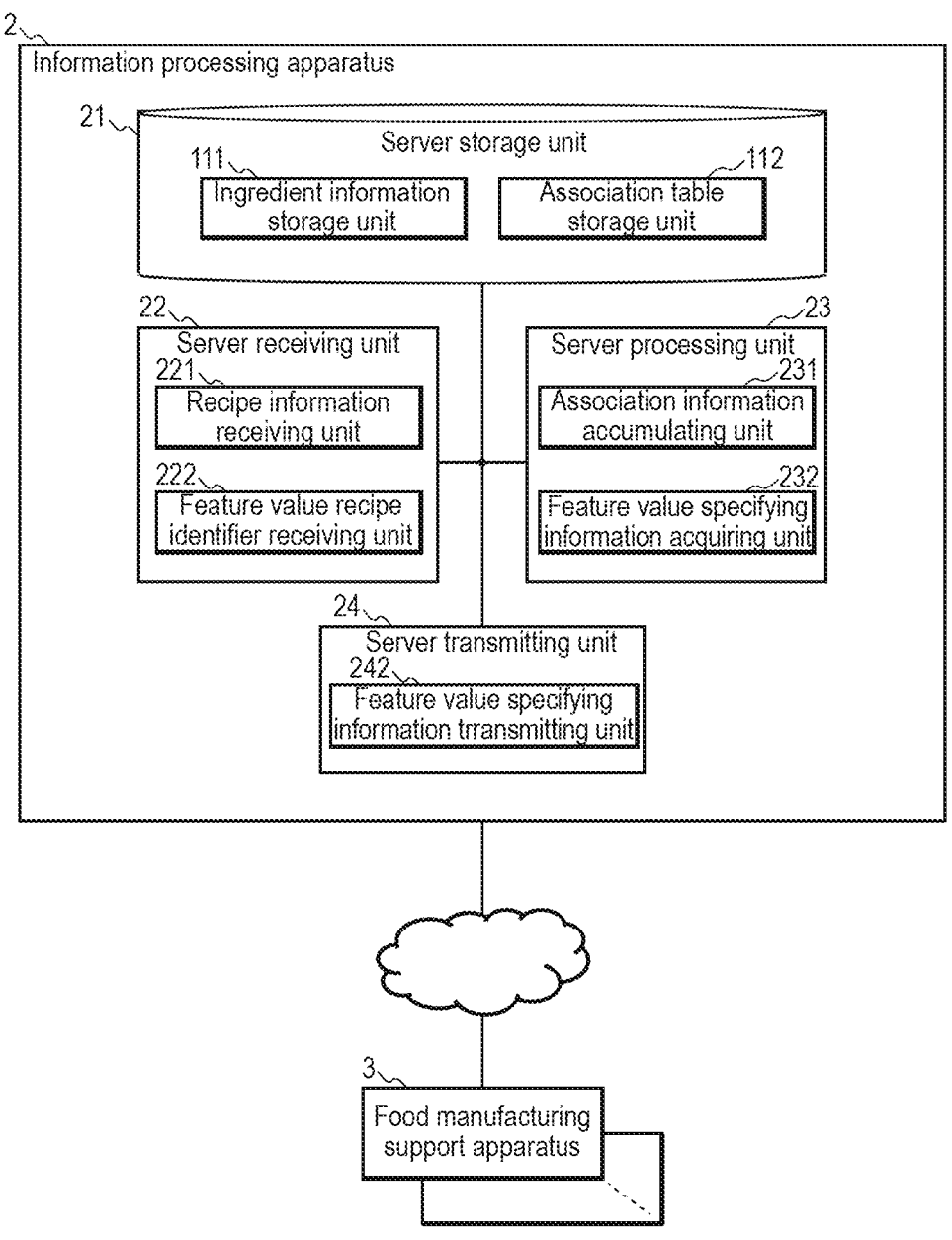
FIG. 8 is a block diagram of the information system A in the embodiment.
Figure 9:
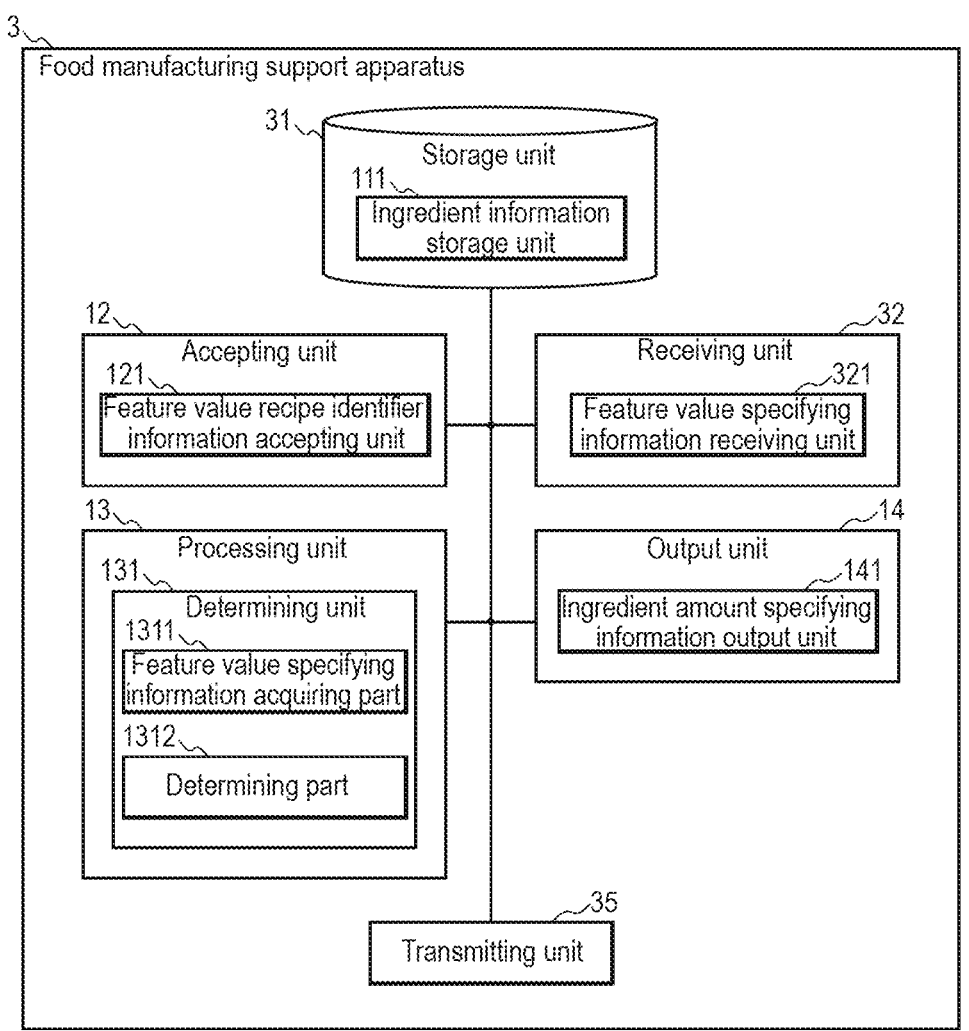
FIG. 9 is a block diagram of a food manufacturing support apparatus 3 in the embodiment.

FIG. 8 is a block diagram of the information system A in this embodiment. FIG. 9 is a block diagram of a food manufacturing support apparatus 3.

The information processing apparatus 2 constituting the information system A includes a server storage unit 21, a server receiving unit 22, a server processing unit 23, and a server transmitting unit 24. The server storage unit 21 includes an ingredient information storage unit 111 and an association table storage unit 112. The server receiving unit 22 includes a recipe information receiving unit 221 and a feature value recipe identifier receiving unit 222. The server processing unit 23 includes an association information accumulating unit 231 and a feature value specifying information acquiring unit 232. The server transmitting unit 24 includes a feature value specifying information transmitting unit 242.

The food manufacturing support apparatus 3 includes a storage unit 31, an accepting unit 12, a receiving unit 32, a processing unit 13, an output unit 14, and a transmitting unit 35. The storage unit 31 includes an ingredient information storage unit 111. The accepting unit 12 includes a feature value recipe identifier information accepting unit 121. The receiving unit 32 includes a feature value specifying information receiving unit 321. The processing unit 13 includes a determining unit 131. The determining unit 131 includes a feature value specifying information acquiring part 1311 and a determining part 1312. The output unit 14 includes an ingredient amount specifying information output unit 141.

Various types of information are stored in the server storage unit 21 constituting the information processing apparatus 2. The various types of information are, for example, ingredient information and an association table.

The server receiving unit 22 receives various types of information, instructions, and the like. The various types of information, instructions, and the like are, for example, recipe information, a feature value recipe identifier.

The recipe information receiving unit 221 receives recipe information. The recipe information receiving unit 221 receives recipe information, for example, from an unshown terminal apparatus or the food manufacturing support apparatus 3. The recipe information has, for example, a feature value recipe identifier and one or more pieces of ingredient amount pair information.

The feature value recipe identifier receiving unit 222 receives a feature value recipe identifier. The feature value recipe identifier receiving unit 222 receives feature value recipe identifier information, for example, from an unshown terminal apparatus or the food manufacturing support apparatus 3.

The server processing unit 23 performs various types of processing. The various types of processing are, for example, processing that is performed by the association information accumulating unit 231 and the feature value specifying information acquiring unit 232.

The association information accumulating unit 231 acquires one or more pieces of feature value specifying information for specifying amounts of one or more feature values paired with an ingredient identifier contained in each of one or more pieces of ingredient amount pair information contained in the recipe information, from the ingredient information storage unit 111. The association information accumulating unit 231 acquires the feature value recipe identifier contained in the one or more pieces of ingredient amount pair information contained in the recipe information. Then, the association information accumulating unit 231 configures association information having the acquired one or more pieces of feature value specifying information and feature value recipe identifier, and accumulates the association information in the association table storage unit 112. The processing that is performed by the association information accumulating unit 231 is similar to the processing that is performed by the association information accumulating unit 132.

The feature value specifying information acquiring unit 232 acquires feature value specifying information associated with each of two or more feature values paired with the feature value recipe identifier, from the association table storage unit 112.

The server transmitting unit 24 transmits various types of information. The various types of information are, for example, two or more pieces of feature value specifying information and two or more pieces of feature value pair information. The feature value pair information is a pair of a feature value identifier and feature value specifying information.

The feature value specifying information transmitting unit 242 transmits the two or more pieces of feature value specifying information acquired by the feature value specifying information acquiring unit 232. The transmitting in this example is, for example, transmitting to the food manufacturing support apparatus 3.

Various types of information are stored in the storage unit 31 constituting the food manufacturing support apparatus 3. The various types of information are, for example, an apparatus identifier for identifying the food manufacturing support apparatus 3.

The accepting unit 12 accepts various types of instructions, information, and the like. The various types of instructions, information, and the like are, for example, a feature value recipe identifier.

The various types of instructions, information, and the like may be input by any device such as a touch panel, a keyboard, a mouse, or a menu screen. The accepting unit 12 may be realized by a device driver for an input device such as a touch panel or a keyboard, or control software for a menu screen.

The feature value recipe identifier information accepting unit 121 accepts feature value recipe identifier information. In this example, the feature value recipe identifier information is typically a feature value recipe identifier.

The receiving unit 32 receives various types of information. The various types of information are, for example, two or more pieces of feature value specifying information and two or more pieces of feature value pair information.

The feature value specifying information receiving unit 321 receives two or more pieces of feature value specifying information acquired using the feature value recipe identifier accepted by the feature value recipe identifier information accepting unit 121, from the information processing apparatus 2. The feature value specifying information is, for example, feature value pair information or a vector of feature value specifying information.

The transmitting unit 35 transmits the feature value recipe identifier accepted by the feature value recipe identifier information accepting unit 121, to the information processing apparatus 2.

The server storage unit 21 and the storage unit 31 are preferably non-volatile storage media, but can also be realized by volatile storage media.

There is no limitation on the procedure in which information is stored in the server storage unit 21 and the like. For example, information may be stored in the server storage unit 21 and the like via a storage medium, information transmitted via a communication line or the like may be stored in the server storage unit 21 and the like, or information input via an input device may be stored in the server storage unit 21 and the like.

The server receiving unit 22, the recipe information receiving unit 221, the feature value recipe identifier receiving unit 222, the receiving unit 32, and the feature value specifying information receiving unit 321 are typically realized by wired or wireless communication parts, but may also be realized by broadcast receiving parts.

The server processing unit 23, the association information accumulating unit 231, and the feature value specifying information acquiring unit 232 may be realized typically by processors, memories, or the like. Typically, the processing procedure of server processing unit 23 is realized by software, and the software is stored in a storage medium such as a ROM. Note that the processing procedure may be realized by hardware (a dedicated circuit). The processors are, for example, CPUs, MPUs, or GPUs, but there is no limitation on the type thereof.

The server transmitting unit 24, the feature value specifying information transmitting unit 242, and the transmitting unit 35 are typically realized by wired or wireless communication parts, but may also be realized by broadcasting parts.

The accepting unit 12 and the feature value recipe identifier information accepting unit 121 may be realized by a device driver for an input device such as a touch panel or a keyboard, or control software for a menu screen.

Next, an operation of the information system A will be described. First, an operation example of the information processing apparatus 2 will be described with reference to the flowchart in FIG. 10.

(Step S1001) The feature value recipe identifier receiving unit 222 determines whether or not it has received a feature value recipe identifier. If it has received a feature value recipe identifier, the procedure advances to step S1002, or otherwise the procedure advances to step S1004.

(Step S1002) The feature value specifying information acquiring unit 232 acquires two or more pieces of feature value specifying information paired with the feature value recipe identifier received in step S1001, from the association table storage unit 112.

(Step S1003) The feature value specifying information transmitting unit 242 transmits the two or more pieces of feature value specifying information acquired in step S1002.

(Step S1004) The recipe information receiving unit 221 determines whether or not it has received recipe information. If it has received recipe information, the procedure advances to step S1005, or otherwise the procedure returns to step S1001.

(Step S1005) The association information accumulating unit 132 performs processing for configuring association information using the recipe information accepted in step S1004. An example of this association information configuring processing was described with reference to the flowchart in FIG. 4.

(Step S1006) The association information accumulating unit 132 accumulates the association information configured in step S1005, in the association table storage unit 112.

Figure 10:
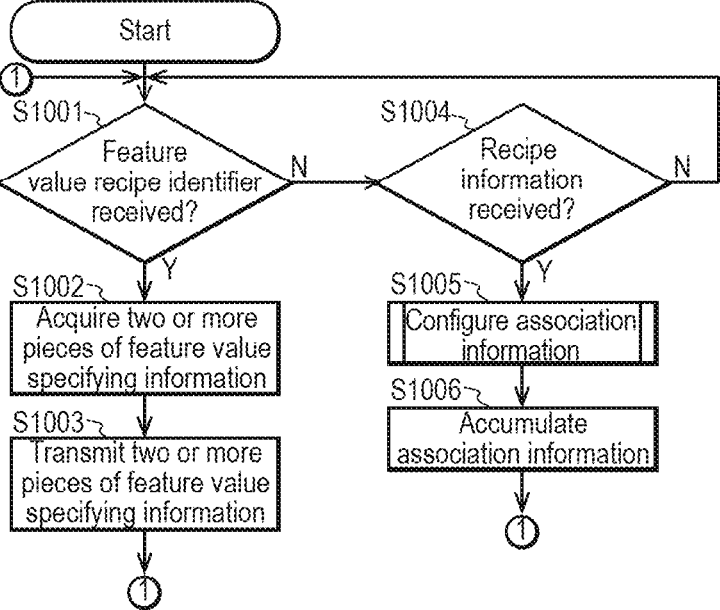
FIG. 10 is a flowchart illustrating an operation example of an information processing apparatus 2 in the embodiment.

In the flowchart in FIG. 10, the processing ends at power off or at an interruption of termination processing.

Next, an operation example of the food manufacturing support apparatus 3 will be described with reference to the flowchart in FIG. 11. In the flowchart in FIG. 11, a description of the same steps as those in the flowchart in FIG. 3 has been omitted.

(Step S1101) The feature value recipe identifier information accepting unit 121 determines whether or not it has accepted a feature value recipe identifier. If it has accepted a feature value recipe identifier, the procedure advances to step S1102, or otherwise the procedure returns to step S1101.

(Step S1102) The transmitting unit 35 transmits the feature value recipe identifier accepted in step S1101, to the information processing apparatus 2.

(Step S1103) The feature value specifying information receiving unit 321 determines whether or not it has received two or more pieces of feature value specifying information from the information processing apparatus 2. If it has received two or more pieces of feature value specifying information, the procedure advances to step S302, or otherwise the procedure returns to step S1103.

(Step S1104) The ingredient amount specifying information output unit 141 outputs the acquired ingredient amount pair information. The procedure returns to step S1101.

Figure 11:
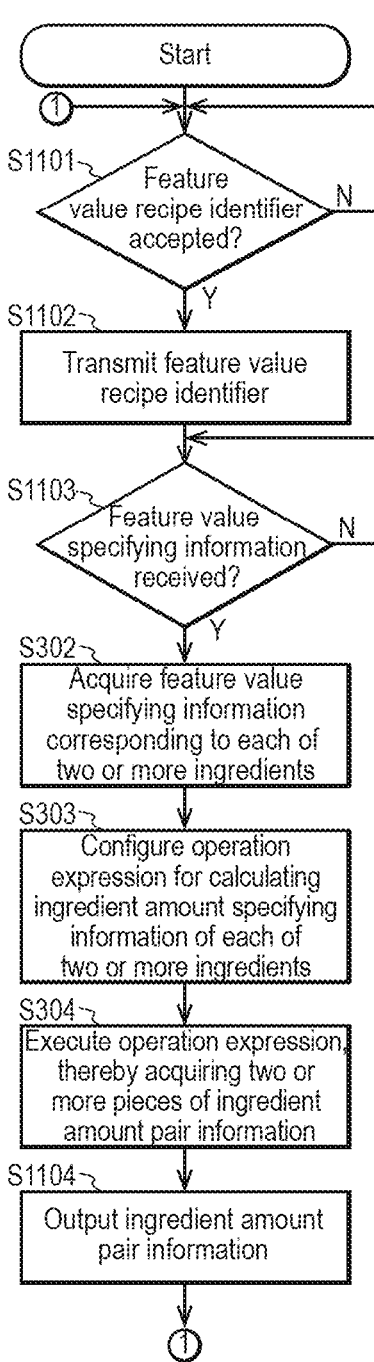
FIG. 11 is a flowchart illustrating an operation example of a food manufacturing support apparatus 3 in the embodiment.

In the flowchart in FIG. 11, the processing ends at power off or at an interruption of termination processing.

As described above, according to this embodiment, it is possible for terminals such as the food manufacturing support apparatuses 3 to obtain feature value specifying information from the information processing apparatus 2 for managing feature value recipes.

Furthermore, according to this embodiment, it is possible to use feature value recipes stored in the information processing apparatus 2, at two or more terminals.

Furthermore, according to this embodiment, it is possible to register feature value recipes with the information processing apparatus 2.

The program of the information processing apparatus 2 in this embodiment is a program for causing a computer capable of accessing: an ingredient information storage unit in which two or more pieces of ingredient information are stored, the ingredient information each having one or more pieces of feature value specifying information for specifying an amount of each of one or more feature values contained in an ingredient of food, and an ingredient identifier for specifying the ingredient; and an association table storage unit in which an association table containing two or more pieces of association information is stored, the association information each indicating association between feature value recipe identifier information and feature value specifying information associated with each of two or more feature values, to function as: a recipe information receiving unit that receives recipe information having feature value recipe identifier information, and one or more pieces of ingredient amount pair information, each of which is a pair of an ingredient identifier and ingredient amount specifying information for specifying an amount of an ingredient; an association information accumulating unit that acquires one or more pieces of feature value specifying information for specifying amounts of one or more feature values paired with an ingredient identifier contained in each of one or more pieces of ingredient amount pair information contained in the recipe information, from the ingredient information storage unit, configures association information having the one or more pieces of feature value specifying information and the feature value recipe identifier information contained in the one or more pieces of ingredient amount pair information contained in the recipe information, and accumulates the association information in the association table storage unit.

Furthermore, the program of the food manufacturing support apparatus 3 in this embodiment is a program for causing a computer capable of accessing an ingredient information storage unit in which two or more pieces of ingredient information are stored, the ingredient information each having one or more pieces of feature value specifying information for specifying an amount of each of one or more feature values contained in an ingredient of food, and an ingredient identifier for specifying the ingredient, to function as: a feature value recipe identifier information accepting unit that accepts a feature value recipe identifier for specifying two or more pieces of feature value specifying information respectively associated with two or more feature values; a transmitting unit that transmits the feature value recipe identifier to an information processing apparatus; a feature value specifying information receiving unit that receives feature value specifying information associated with each of two or more feature values, using a feature value recipe identifier accepted by the feature value recipe identifier information accepting unit from the information processing apparatus; a determining unit that determines two or more ingredients and amounts of the ingredients that satisfy two or more pieces of feature value specifying information received by the feature value specifying information receiving unit, referring to the two or more pieces of ingredient information stored in the ingredient information storage unit; and an ingredient amount specifying information output unit that outputs ingredient amount specifying information regarding the amounts of the two or more ingredients determined by the determining unit, in association with ingredient identifiers for respectively specifying the ingredients.

Embodiment 3

In this embodiment, a food manufacturing apparatus will be described that acquires two or more ingredients in amounts corresponding to the respective pieces of amount specifying information of the ingredients output by the food manufacturing support apparatus 1 or the food manufacturing support apparatus 3, from an ingredient storage, and manufactures food.

Figure 12:
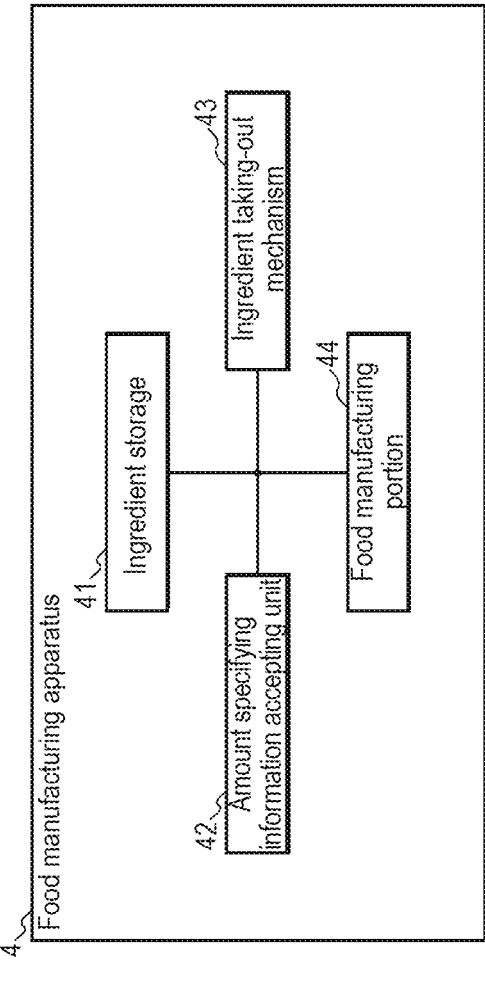
FIG. 12 is a block diagram of a food manufacturing apparatus 4 in Embodiment 3.

FIG. 12 is a block diagram of a food manufacturing apparatus 4 in this embodiment. The food manufacturing apparatus 4 includes an ingredient storage 41, an amount specifying information accepting unit 42, an ingredient taking-out mechanism 43, and a food manufacturing portion 44.

Two or more ingredients are stored in the ingredient storage 41. It is preferable that the ingredient are, for example, each a powder or a liquid.

The amount specifying information accepting unit 42 accepts two or more pieces of amount specifying information output by the food manufacturing support apparatus 1 or the food manufacturing support apparatus 3.

The ingredient taking-out mechanism 43 takes out two or more ingredients in the amounts specified with the respective pieces of amount specifying information of the ingredients accepted by the amount specifying information accepting unit 42, from the ingredient storage 41.

The food manufacturing portion 44 manufactures food using the two or more ingredients taken out by the ingredient taking-out mechanism 43. The manufacturing in this example may include mixing or only receiving the ingredients taken out by the ingredient taking-out mechanism 43. It is sufficient that the manufacturing means obtaining food from two or more ingredients.

As described above, according to this embodiment, it is possible to obtain food with a reproduced taste, flavor, and the like.

The food manufacturing apparatus 4 may include the food manufacturing support apparatus 1 or the food manufacturing support apparatus 3.

Figure 13:
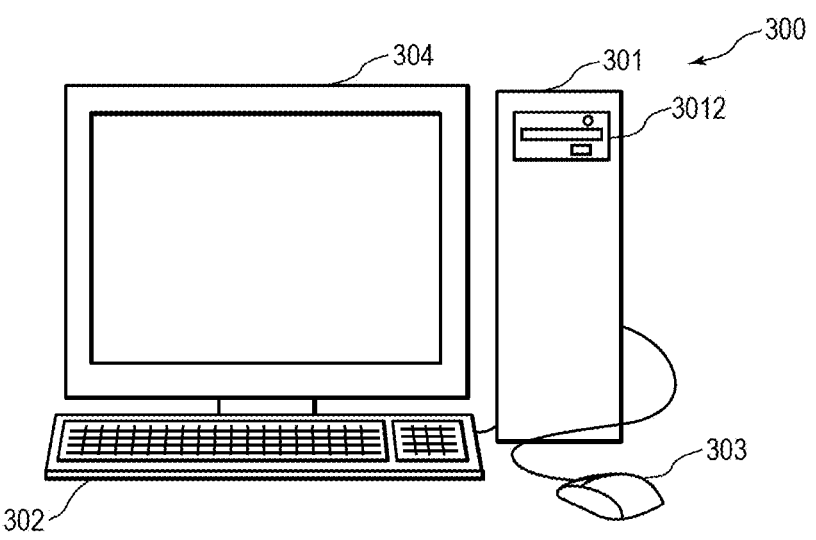
FIG. 13 is a schematic view of a computer system in the foregoing embodiments.
Figure 14:
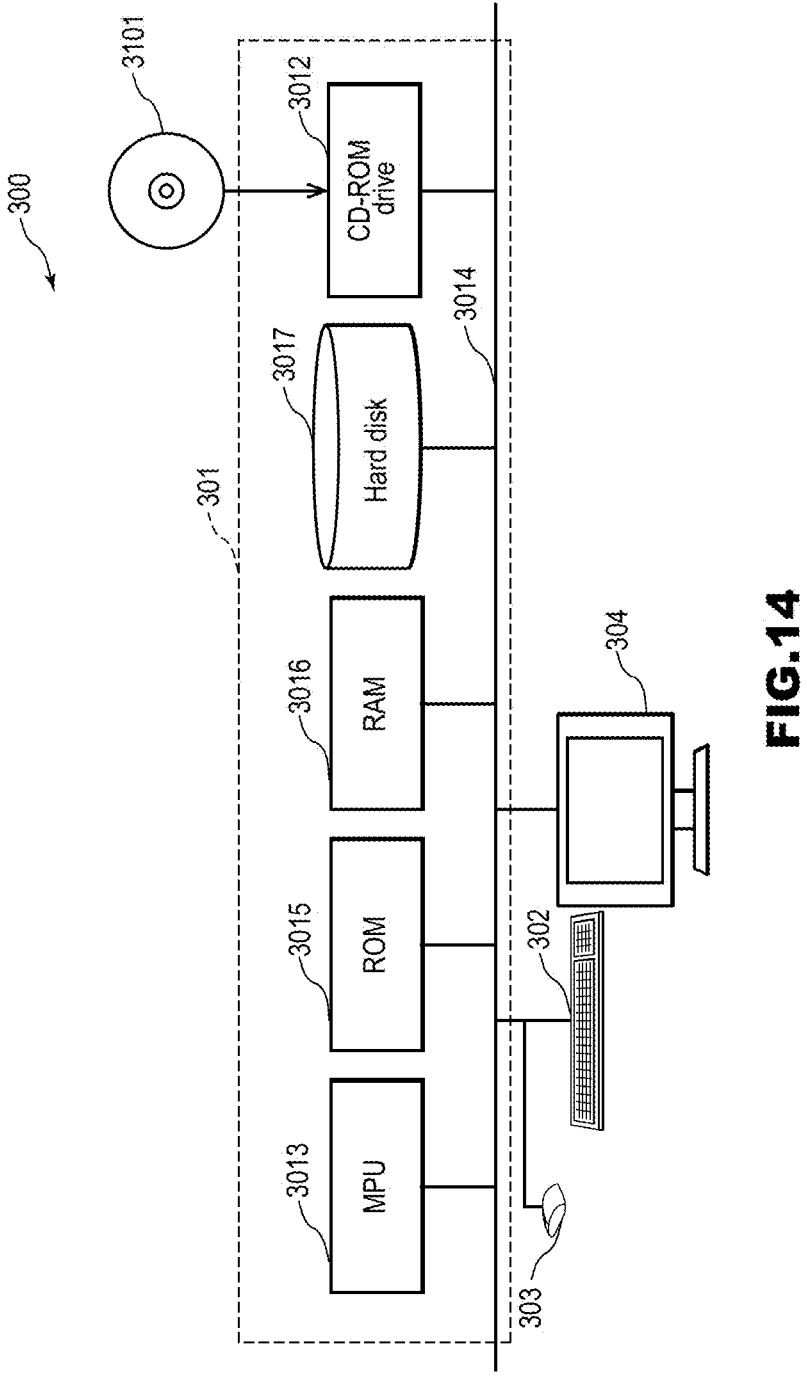
FIG. 14 is a block diagram of the computer system in the embodiments.

FIG. 13 shows the external appearance of a computer that executes the program described in this specification to realize the food manufacturing support apparatus 1 and the like in the foregoing various embodiments. The foregoing embodiments may be realized using computer hardware and a computer program executed thereon. FIG. 13 is a schematic view of a computer system 300. FIG. 14 is a block diagram of the system 300.

In FIG. 13, the computer system 300 includes a computer 301 including a CD-ROM drive, a keyboard 302, a mouse 303, and a monitor 304.

In FIG. 14, the computer 301 includes, in addition to the CD-ROM drive 3012, an MPU 3013, a bus 3014 connected to the CD-ROM drive 3012 and the like, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

The program for causing the computer system 300 to execute the functions of the food manufacturing support apparatus 1 and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the food manufacturing support apparatus 1 and the like in the foregoing embodiments. The program may only include a command portion to call an appropriate function (module) in a controlled mode and obtain desired results. The manner in which the computer system 300 operates is well known, and thus a detailed description thereof has been omitted.

Furthermore, the computer that executes the program may be a single computer, or may be multiple computers. That is to say, centralized processing may be performed, or distributed processing may be performed.

Furthermore, in the foregoing embodiments, it will be appreciated that at least two communication parts in one apparatus may be physically realized by one medium.

In the foregoing embodiments, each process may be realized as centralized processing using a single apparatus, or may be realized as distributed processing using multiple apparatuses.

The present invention is not limited to the embodiment set forth herein. Various modifications are possible within the scope of the present invention.

INDUSTRIAL APPLICABILITY

As described above, the food manufacturing support apparatus according to the present invention has an effect that it is possible to support reproduction of a taste, a flavor, and the like of food, and thus this apparatus is useful as a food manufacturing support apparatus and the like.

The invention claimed is:

1. A food manufacturing method comprising:

providing a food manufacturing support apparatus comprising:

an ingredient information storage unit in which two or more pieces of ingredient information are stored, the ingredient information each having one or more pieces of feature value specifying information for specifying an amount of each of one or more feature values contained in an ingredient of food, and an ingredient identifier for specifying the ingredient; a feature value recipe identifier information accepting unit; a determining unit; and an ingredient amount specifying information output unit, and an association table storage unit in which an association table containing two or more pieces of association information is stored, the association information each indicating association between a feature value recipe identifier for identifying a group of two or more pieces of feature value specifying information, and two or more pieces of feature value pair information containing feature value specifying information associated with feature values;

a feature value recipe identifier information accepting step of the feature value recipe identifier information accepting unit accepting one feature value recipe identifier of two or more feature value recipe identifiers;

a determining step of the determining unit determining two or more ingredients and amounts of the ingredients that satisfy two or more pieces of feature value specifying information of the two or more feature values specified with the feature value recipe identifier information accepted in the feature value recipe identifier information accepting step, referring to the two or more pieces of ingredient information stored in the ingredient information storage unit; and an ingredient amount specifying information output step of the ingredient amount specifying information output unit outputting ingredient amount specifying information regarding the amounts of the ingredients in association with ingredient identifiers for respectively specifying the two or more ingredients determined in the determining step, wherein the determining step includes:

acquiring two or more pieces of feature value specifying information of two or more feature values corresponding to a feature value recipe identifier, which is feature value recipe identifier information accepted by the feature value recipe identifier information accepting unit, from the association table storage unit; and determining two or more ingredients and amounts of the ingredients that satisfy the two or more pieces of feature value specifying information acquired by the feature value specifying information acquiring part, wherein the food is a beverage, and wherein the two or more feature values are each obtained through dimensional compression of an aroma component contained in an ingredient of the beverage or a taste component contained in an ingredient of the beverage, the method further comprising:

an ingredient taking-out step of taking out two or more ingredients in the amounts specified with the respective pieces of the ingredient amount specifying information of the ingredients output by the ingredient amount specifying information output step, from an ingredient storage in which two or more ingredients are stored, and a food production step of producing the food using the two or more ingredients taken out in the ingredient taking-out step.

2. The food manufacturing method according to claim 1, wherein the feature values are each based on a chemical component contained in food.

3. The food manufacturing method according to claim 2, wherein the two or more feature values are each obtained through dimensional compression of a chemical component contained in food.

4. The food manufacturing method according to claim 1, wherein the ingredient is a substance derived from a living organism.

5. The food manufacturing method according to claim 1, further comprising:

a recipe information accepting step that accepts recipe information having a feature value recipe identifier, and one or more pieces of ingredient amount pair information, each of which is a pair of an ingredient identifier and ingredient amount specifying information for specifying an amount of an ingredient; and an association information accumulating step that acquires one or more pieces of feature value specifying information for specifying amounts of one or more feature values paired with an ingredient identifier contained in each of one or more pieces of ingredient amount pair information contained in the recipe information, from the ingredient information storage unit, configures association information having the one or more pieces of feature value specifying information and the feature value recipe identifier contained in the one or more pieces of ingredient amount pair information contained in the recipe information, and accumulates the association information.

6. The food manufacturing method according to claim 1, further comprising:

a feature value specifying information receiving step that receives feature value specifying information associated with each of two or more feature values, using a feature value recipe identifier accepted by the feature value recipe identifier information accepting step from an information processing apparatus including an association table storage unit in which an association table containing two or more pieces of association information is stored, the association information each indicating association between a feature value recipe identifier and feature value specifying information associated with each of two or more feature values, wherein the determining step determines two or more ingredients and amounts of the ingredients that satisfy two or more pieces of feature value specifying information received by the feature value specifying information receiving step, referring to the two or more pieces of ingredient information stored in the ingredient information storage unit.

* * * * *